United States Patent
Lin

(10) Patent No.: US 9,479,656 B2
(45) Date of Patent: Oct. 25, 2016

(54) SYSTEM AND METHOD FOR TAKING AND SHARING PHOTOGRAPHS IN A PHOTO KIOSK

(71) Applicant: Andrew Yuan-Da Lin, New York, NY (US)

(72) Inventor: Andrew Yuan-Da Lin, New York, NY (US)

(*) Notice: Subject to any disclaimer, the term of this patent is extended or adjusted under 35 U.S.C. 154(b) by 0 days.

(21) Appl. No.: 14/051,360

(22) Filed: Oct. 10, 2013

(65) Prior Publication Data

US 2015/0103188 A1    Apr. 16, 2015

(51) Int. Cl.
  *H04N 1/00* (2006.01)
  *H04N 5/232* (2006.01)

(52) U.S. Cl.
  CPC ...... *H04N 1/00307* (2013.01); *H04N 1/00137* (2013.01); *H04N 1/00145* (2013.01); *H04N 1/00156* (2013.01); *H04N 1/00164* (2013.01); *H04N 1/00177* (2013.01); *H04N 1/00188* (2013.01); *H04N 1/00289* (2013.01); *H04N 5/23206* (2013.01)

(58) Field of Classification Search
  CPC .................................. H04N 5/23206
  USPC .................................. 348/207.1, 207.11
  See application file for complete search history.

(56) References Cited

U.S. PATENT DOCUMENTS

| | | | |
|---|---|---|---|
| 8,509,944 B1* | 8/2013 | Kranyec | G07F 17/12 700/214 |
| 2008/0310829 A1* | 12/2008 | Bakewell | 396/2 |
| 2012/0072493 A1* | 3/2012 | Muriello et al. | 709/204 |
| 2012/0307080 A1* | 12/2012 | Yumiki et al. | 348/207.11 |
| 2013/0239003 A1* | 9/2013 | Usenko et al. | 715/733 |

* cited by examiner

*Primary Examiner* — Roberto Velez
*Assistant Examiner* — Stephen Coleman
(74) *Attorney, Agent, or Firm* — Winston & Strawn LLP

(57) ABSTRACT

A system and a method for taking photographs in a photo kiosk and sharing the photographs with others using a mobile device loaded with a specialized application. When the user is in the vicinity of a photo kiosk, the mobile device wirelessly connects with the photo kiosk. The user's mobile device is used to take pictures by triggering the camera's shutter using the application on the mobile device. The mobile device retrieves the pictures taken by the user from the photo kiosk during the user's session and presents them to the user. The user may select photos to share with others through email, social media, a public stream, or other known means, or may add photos to the user's profile. Photos may be edited, deleted, tagged, or printed using a wireless printer.

19 Claims, 13 Drawing Sheets

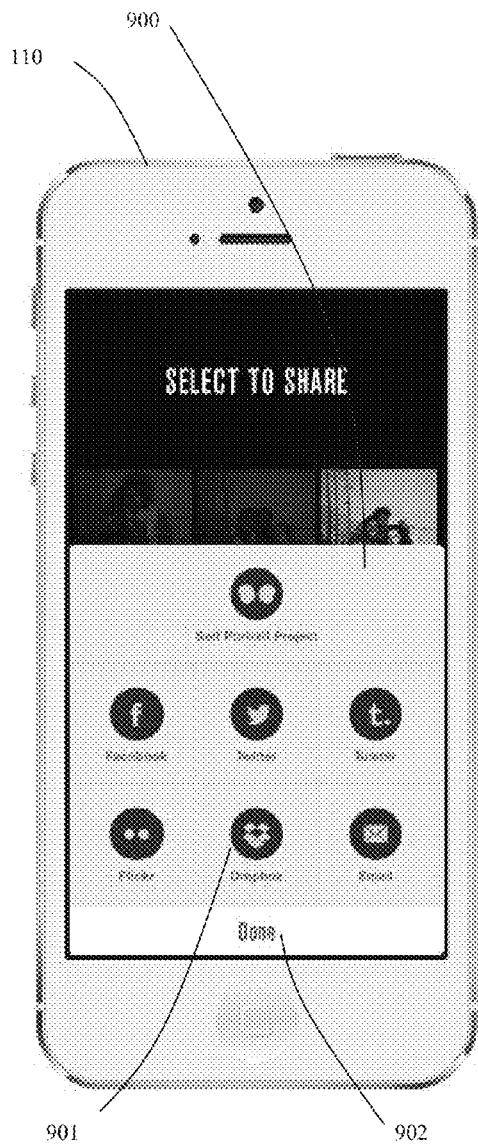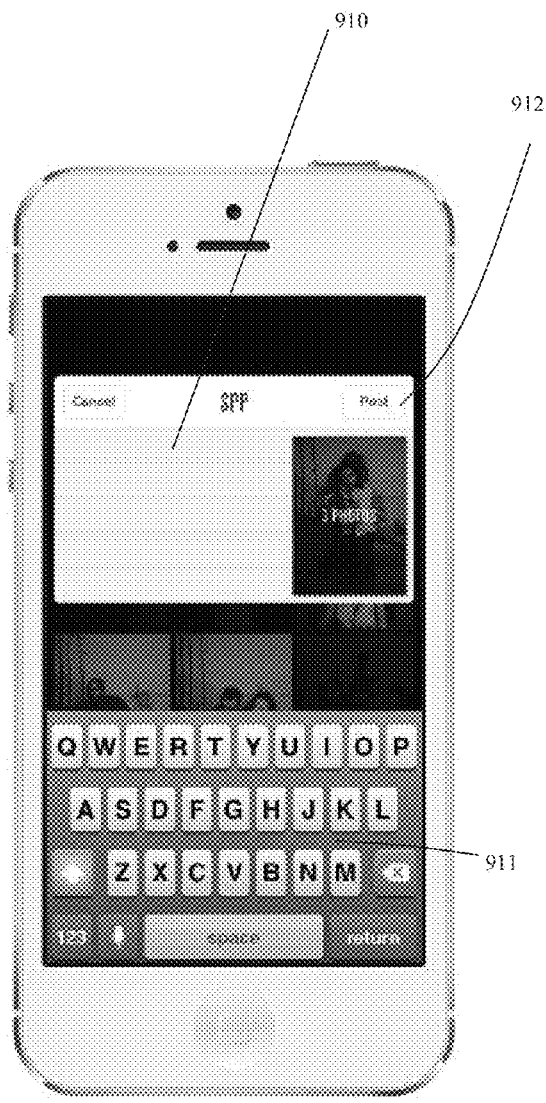
FIGURE 9A                    FIGURE 9B

SYSTEM AND METHOD FOR TAKING AND SHARING PHOTOGRAPHS IN A PHOTO KIOSK

FIELD OF THE INVENTION

The present invention generally relates to systems and methods for operating a photo kiosk and disseminating digital photographs taken thereby.

BACKGROUND OF THE INVENTION

Photo kiosks where users can take pictures of themselves and print them out known since the 1800s. The camera in a typical photo kiosk is triggered after a count-down timer or following an alert, such as a beep or tone. The camera shutter is not triggered at the precise moment chosen by the user. Moreover, once the photo is taken, sharing photos captured at photo kiosks is cumbersome. Photo booths where the picture can be printed are known, but users now desire to share photos electronically though the Internet.

SUMMARY OF THE INVENTION

The present invention makes it possible to use a mobile device to connect wirelessly to a computer associated with a photo booth, also known as a photo kiosk, control the computer to trigger the camera's shutter to take photographs, download the photographs to the mobile device, and edit and share the photographs with others. In accordance with one aspect of the present invention, a user downloads a software application, herein referred to as the Self Portrait Project ("SPP") application to a mobile device. Using the SPP application, the user creates an account or signs in with an existing account, preferably though a social media account.

According to one embodiment, SPP compliant photo kiosks are connected to the Internet, and a user may locate these photo kiosks through the Internet. When the user is in the vicinity of a SPP compliant photo kiosk, the mobile device may wirelessly connect with the photo kiosk using Bluetooth, the cloud or other known means. The SPP application on the user's device informs the user whether the mobile device is connected to the photo kiosk, whether the photo kiosk is available for use, or, if not, when the photo kiosk will be available. When the photo kiosk is available, the user may enter the kiosk and take pictures by triggering the camera's shutter using the SPP application.

The mobile device can directly retrieve the pictures taken by the user from the photo kiosk during the user's session and present them to the user. The user may select photos to share with others through email, social media, a public stream, or other known means, or may add photos to the user's profile. Photos may be edited, deleted tagged, or printed using a wireless printer.

BRIEF DESCRIPTION OF THE DRAWINGS

For the purposes of illustrating the present invention, there is shown in the drawings a form which is presently preferred, it being understood however, that the invention is not limited to the precise form shown by the drawings in which:

FIGS. 9A and 9B show a user sharing photos;

DETAILED DESCRIPTION OF THE INVENTION

Figure 1:
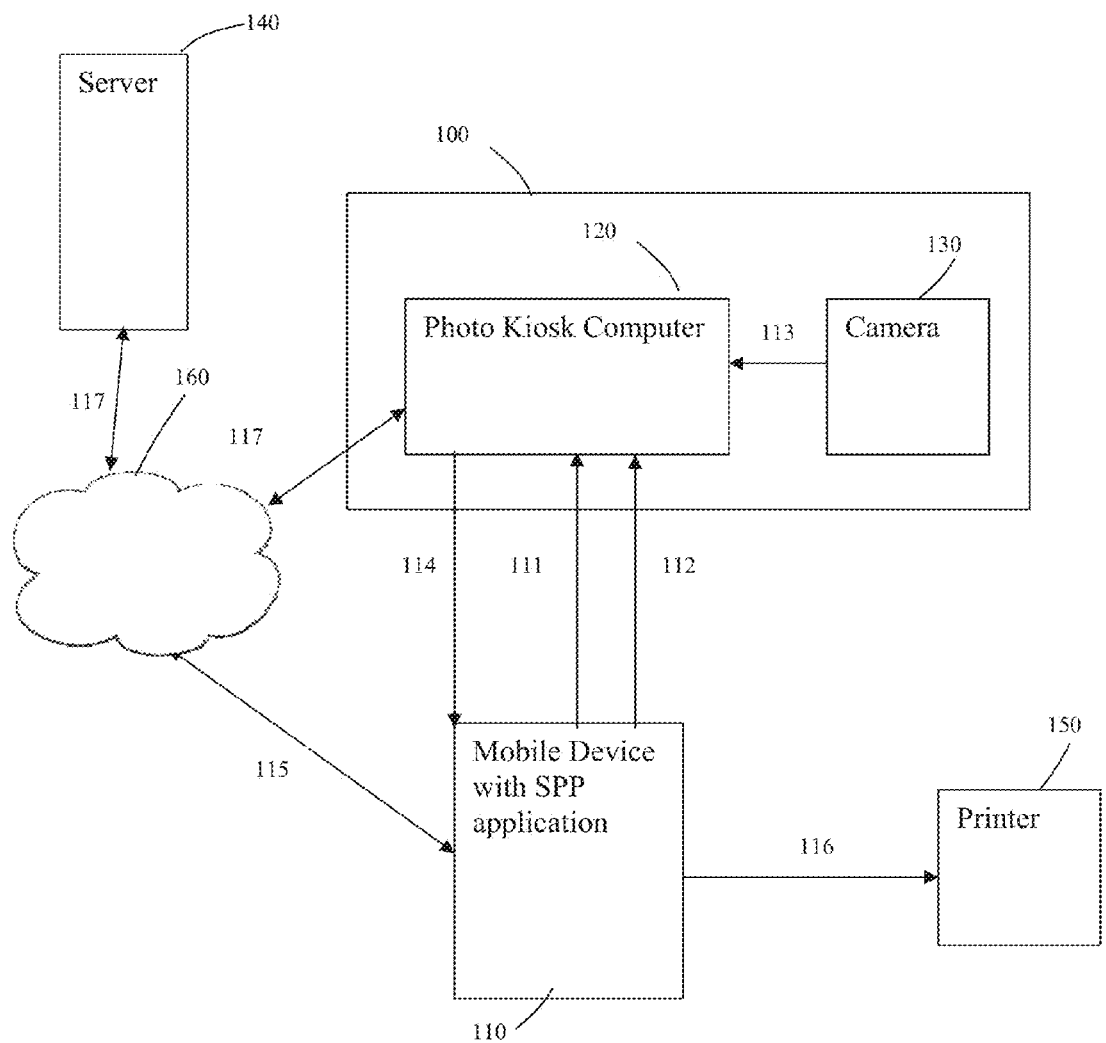
FIG. 1 depicts an overview of the photo kiosk and the overall operation of the SPP application on the mobile device.

Referring now to FIG. 1, there is seen a first embodiment of the present invention in which a user's mobile device 110 connects wirelessly to a computer 120 associated with a photo booth 100, also known as a photo kiosk. As further described below, the user can use her device 110 to control the triggering of a shutter in the photo kiosk's camera 130 to take photographs. Using the wireless connection, the user can download the photographs to the mobile device 110, and edit and share the photographs with others from the mobile device 110. As appreciated by those skilled in the art, the photo kiosk 100 includes a housing that contains the computer 120 and the camera.

In one embodiment, the user's wireless device 110 loaded with the SPP application sends data 111 to the photo kiosk computer 120 loaded with photo kiosk software to initiate a wireless connection between the wireless device 110 and the computer 120. In response, the computer 120 connects the wireless device 110 to the computer 120.

When the user initiates the taking of a photograph using the SPP application on the mobile device 110, the mobile device sends data 112 to the kiosk computer 120, causing software on the kiosk computer 120 to trigger the shutter on the camera 130. The camera 130 sends the photographs 113 to the kiosk computer 120 preferably by a wired connection, such as a USB connection. Following the application of any filters, which may adjust characteristics of the photographs, such as color saturation and contrast, the computer 120 sends the photographs 114 wirelessly to the mobile device 110. The user may then share 115 the photographs with other users through the Internet 160 using social media, email or other electronic communication means.

In one embodiment, the user has an SPP account on a central server 140. The user can upload her photos to the central server 140 either from her mobile device 110 or directly from the computer 120. As appreciated by those skilled in the art, server 140 can be considered a "cloud" with respect to the user and her device 110. The cloud can actually be comprised of several servers performing interconnected and distributed functions (e.g., web interfaces, storage . . . ). For the sake of simplicity in the present discussion, only a single server 110 will be described. The user can connect to the server 110 via the Internet 160, a telephone network (e.g., wirelessly through a cellphone network) or other suitable electronic communication means. In this embodiment, the user's photographs can be stored on the server 140 as well as be shared via the communication channels described above. FIG. 1 also illustrated that the photo kiosk computer 120 is connected to the server 140 via the Internet 160. This connection can be used to transfer data, photographs and billing information related to a user's use of the photo kiosk 100.

The user may optionally wirelessly connect 116 to a printer 150 and send pictures to the printer 150 for printing. Although not illustrated in FIG. 1, the printer 150 may be part of the kiosk 100 and the user can print her photos directly from her device 110, use her device 110 to control the kiosk computer 120 to print the photos, or use control on the kiosk to control the computer 120 to print the photos.

Figure 2:
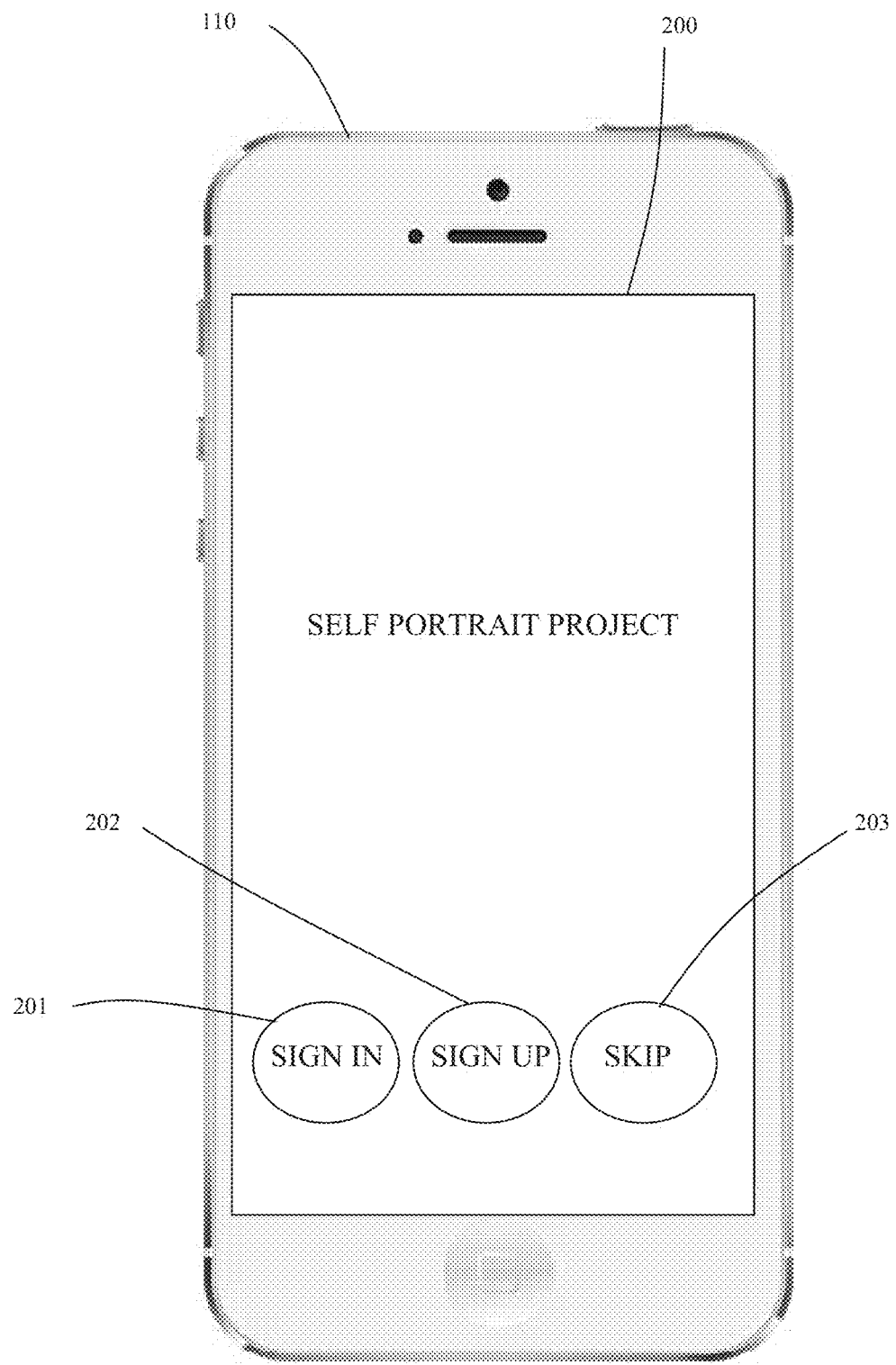
FIG. 2 depicts the cover screen of the SPP application on a mobile device.

As shown in the FIG. 2, the user's mobile device 110 is loaded with the SPP application with a home screen 200. The user may sign into the SPP application by selecting "sign in" 201 or sign up for an account using an email account or social media, account, such as Facebook or Twitter, by selecting "sign up" 202. As described above, using the "sign up" button establishes a connection to the server 140 where the user can create an account. If the user selects the "sign-in" button 201, she is preferably connected to the server 140 and logged into her account as described above. The user may also use the "skip" button 203 to browse the SPP Stream (described below), or browse the archive of public Self Portrait Project photos, without signing into her account.

Figure 3:
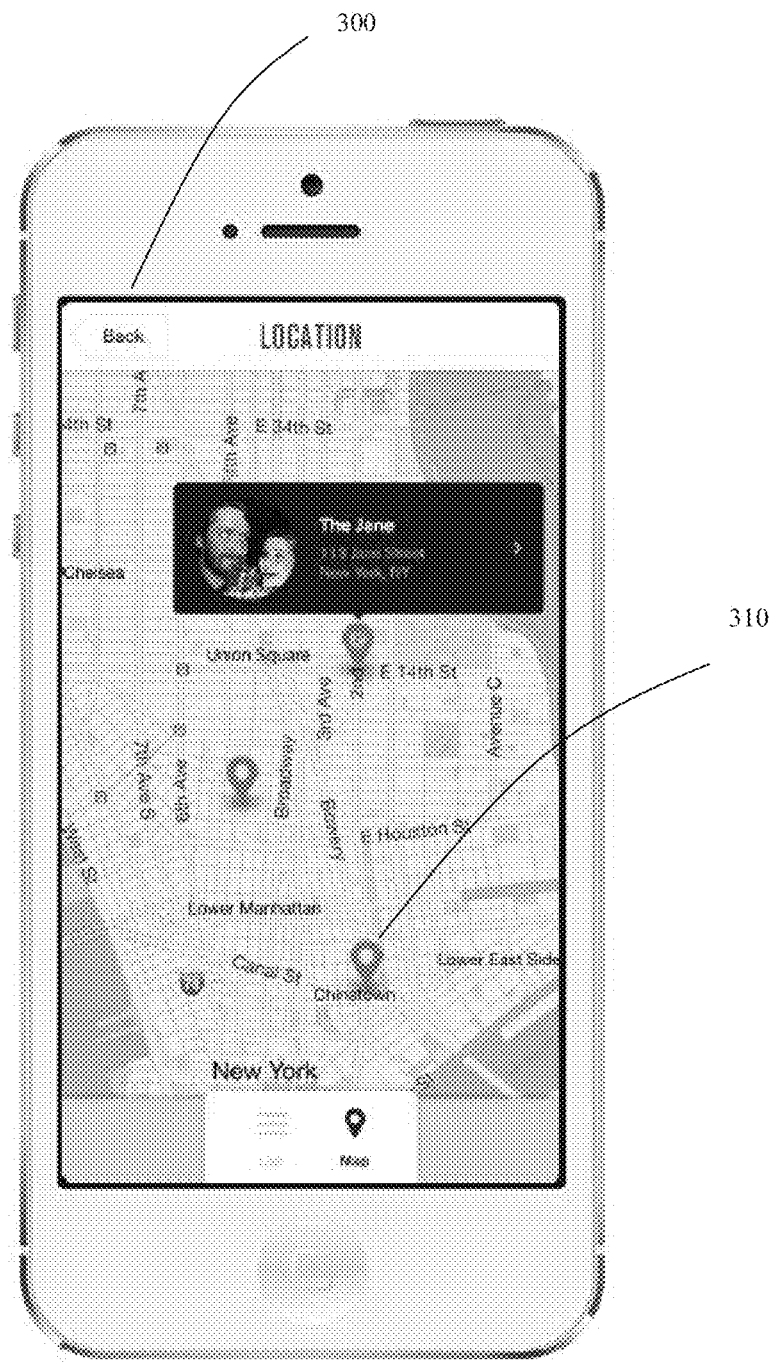
FIG. 3 depicts a map showing the locations of photo kiosks.

Referring now to FIG. 3, the SPP application may present a map to the user showing the locations of photo kiosks in an area chosen by the user or in the proximity of the user. The locations of the kiosks may be stored in the SPP application itself and periodically updated from the server 140, or may be retrieved in real-time directly from the server 140. The SPP application also identifies the closest kiosk based in the user's current location, using a location function in the device 110. Upon selection of an icon 310 on the kiosk map, the SPP application may present information regarding the selected kiosk, including a description of the kiosk and its location, directions to the kiosk, and photos that have been shared by users at that kiosk.

Figure 4A:
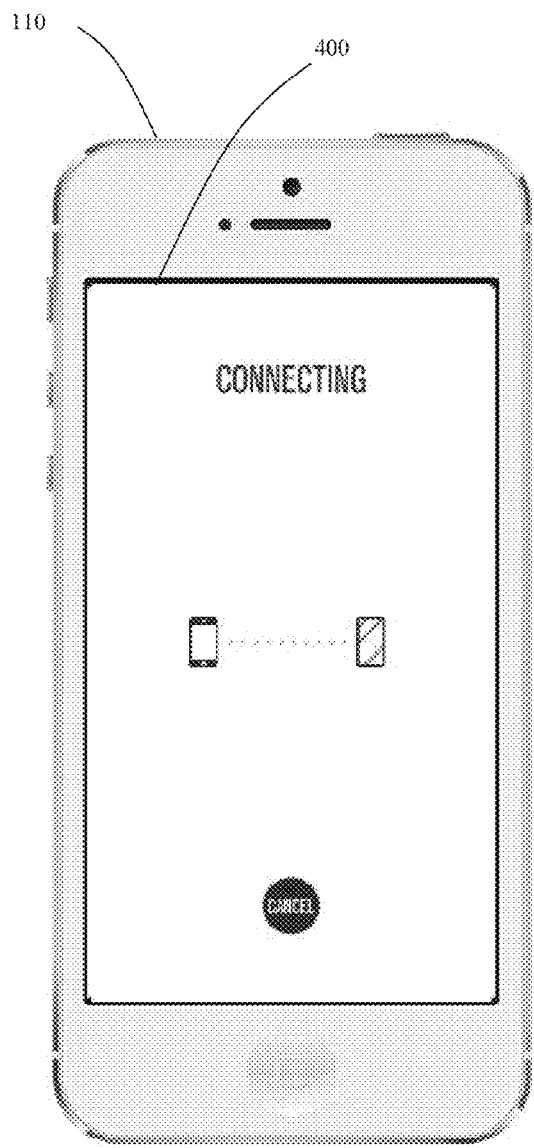
FIGS. 4A and 4B depict the mobile device connecting to a photo kiosk.
Figure 4B:
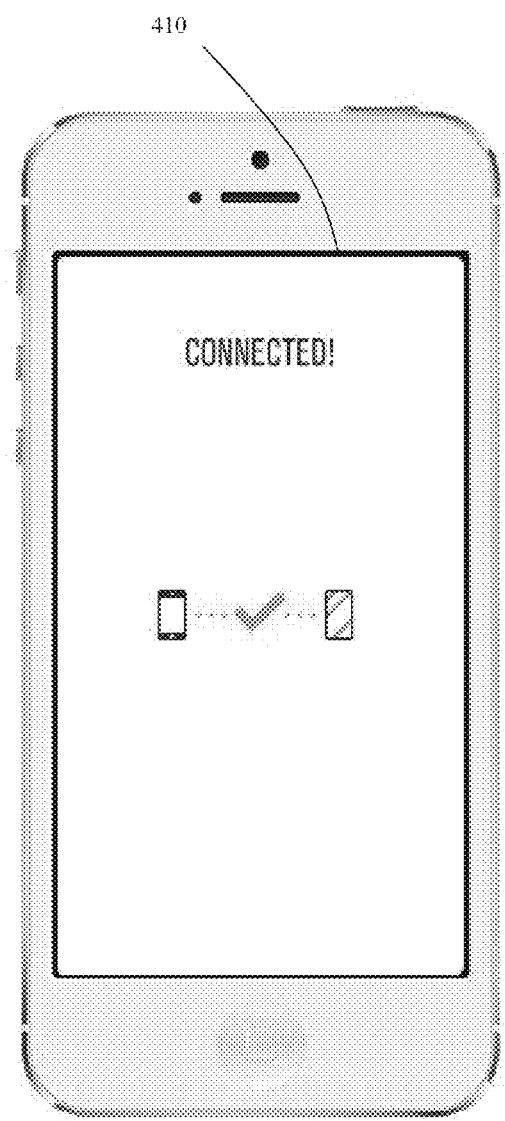

Referring now to FIGS. 4A and 4B, the SPP application attempts to connect to a kiosk computer 120 wirelessly, such as through Bluetooth, or other known wireless technology. The SPP application indicates when the mobile device 110 is attempting to connect 400 to a kiosk computer and when that connection is successful 410.

Figure 5A:
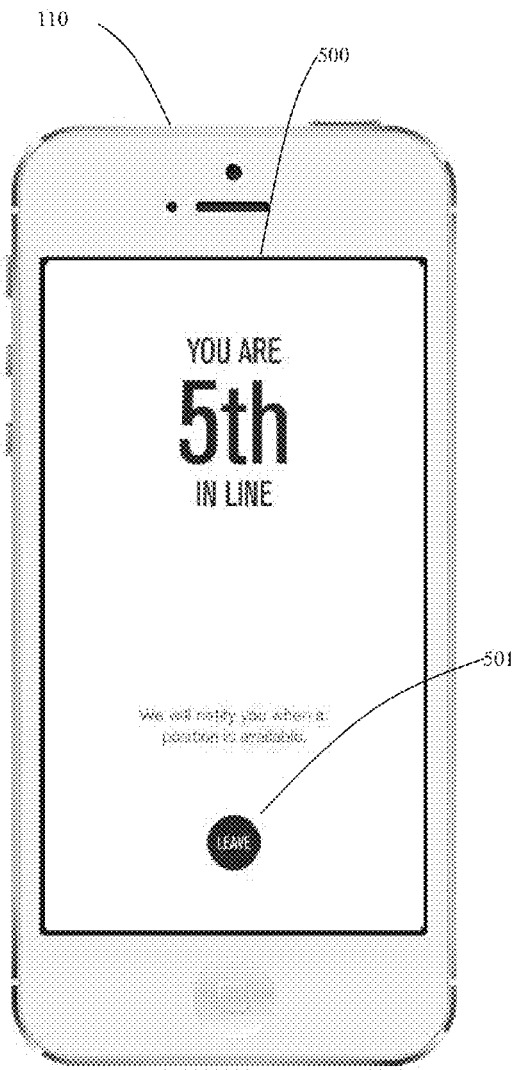
FIGS. 5A and 5B depict the mobile device obtaining a place in line at a photo kiosk and the notifying the user that the photo kiosk is ready for the user.
Figure 5B:
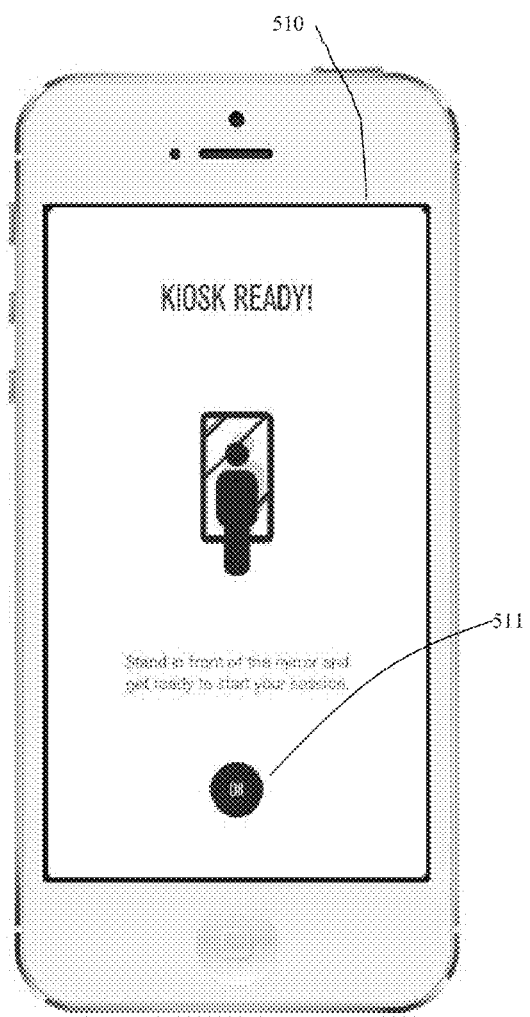

As illustrated in FIGS. 5A and 5B, upon a successful connection to the kiosk computer 120, the SPP application presents a screen 500 informing the user of her place in line at that kiosk. Should the user decide to leave the kiosk, the user may touch "LEAVE" 501 to relinquish her place in line. When the kiosk is ready to accept the user, the SPP application presents a screen 510 so informing the user, which the user acknowledges by selecting "OK" 511.

Figures 6A, 6B, 6C:
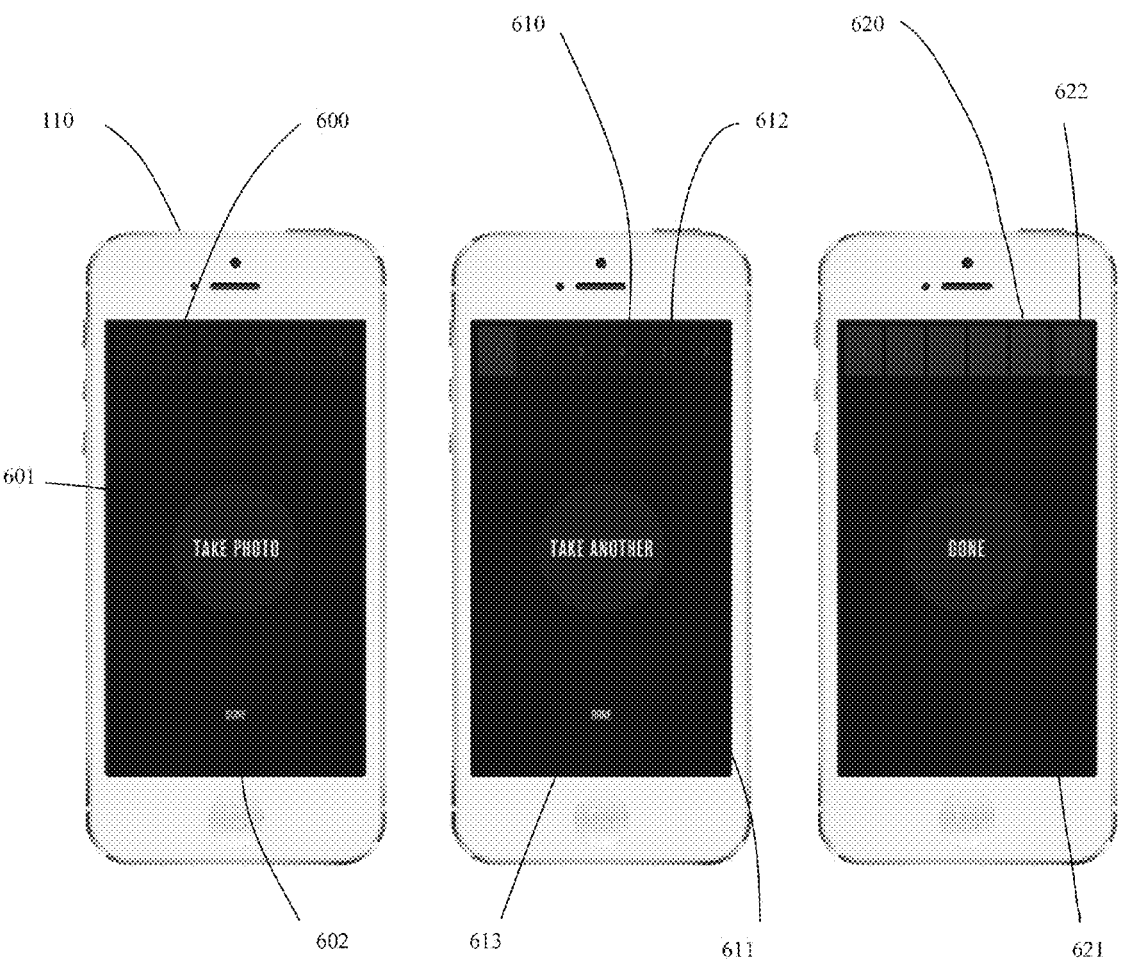
FIGS. 6A, 6B and 6C show the interfaces for controlling the kiosk camera's shutter.

When the user enters the photo kiosk 100 and positions herself in front of the camera 130, the user is ready to take pictures of herself and perhaps others whom she has invited into the kiosk 100. As shown in FIGS. 6A, 6B and 6C, the SPP application provides the user with the ability to trigger the shutter on the camera 130 at a time of her choosing. The Take Photo user interface 600 is presented to the user. By selecting the button "Take Photo" 601, the kiosk computer 120 engages the shutter of the camera 130, and a picture of the user and others in the kiosk 100 is taken. In one embodiment, each picture taken by the user is sent by wired connection from the camera 130 to the kiosk computer 120 immediately upon the user taking the photo. In an alternative embodiment, the camera 130 sends all of the user's photos to the kiosk computer 120 upon completion of her session. In one embodiment, photos are received in the kiosk computer 120 and filters are applied to the photos by the kiosk computer 120. A filter affects characteristics of a photo, such as contrast and color saturation. In another embodiment, each kiosk 100 has one filter applied to all photos taken in the kiosk 100. The user may end her session in the kiosk 100 without taking any photos by selecting "Done" 602 as illustrated in FIG. 6A.

The SPP application allows the user to take a plurality of pictures by presenting the user with the Take Another user interface 610 as illustrated in FIG. 6B. By selecting the "Take Another" button 611, the user may continue to take photos until the maximum number of photos per session is reached. The Take Another user interface 610 displays the number of photos taken 612 relative to the maximum number of photos. The user may end the session by selecting "Done" 613 before reaching the maximum number of photos per session.

Upon reaching the maximum number of photos in its session, the user is presented with the Done screen 620 illustrated in FIG. 6C showing that the maximum number of photos has been reached 622. The user selects "Done" 621 to end the session.

Figure 7A:
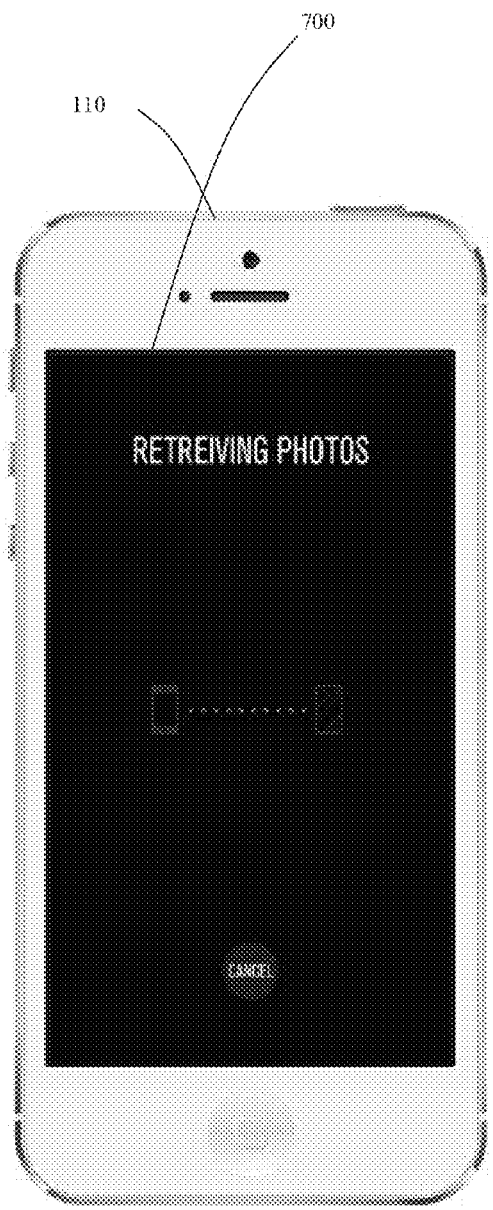
FIGS. 7A and 7B depict the mobile device downloading the user's photos.
Figure 7B:
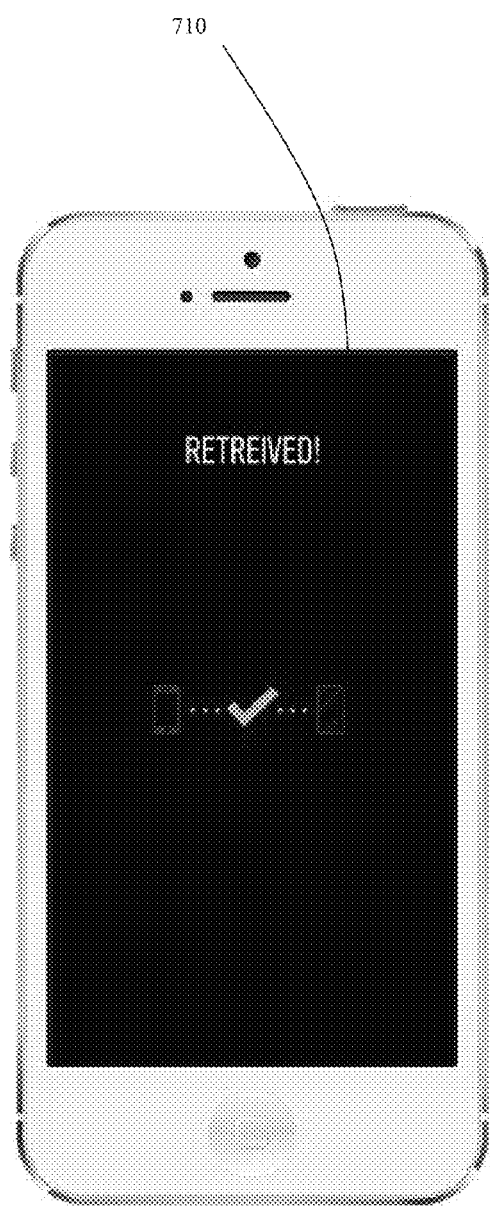

Upon completion of the user's photo session, the photo kiosk computer 120 sends the photographs wirelessly to the mobile device 110. As shown in FIG. 7, the user is informed that the photo transfer is occurring 700 and is notified when it is successfully completed 710. Alternatively, the photo kiosk computer 120 can send the photos to the user's account on the server 140, either in conjunction with or in lieu of sending them directly to the user's device 110.

Figure 8A:
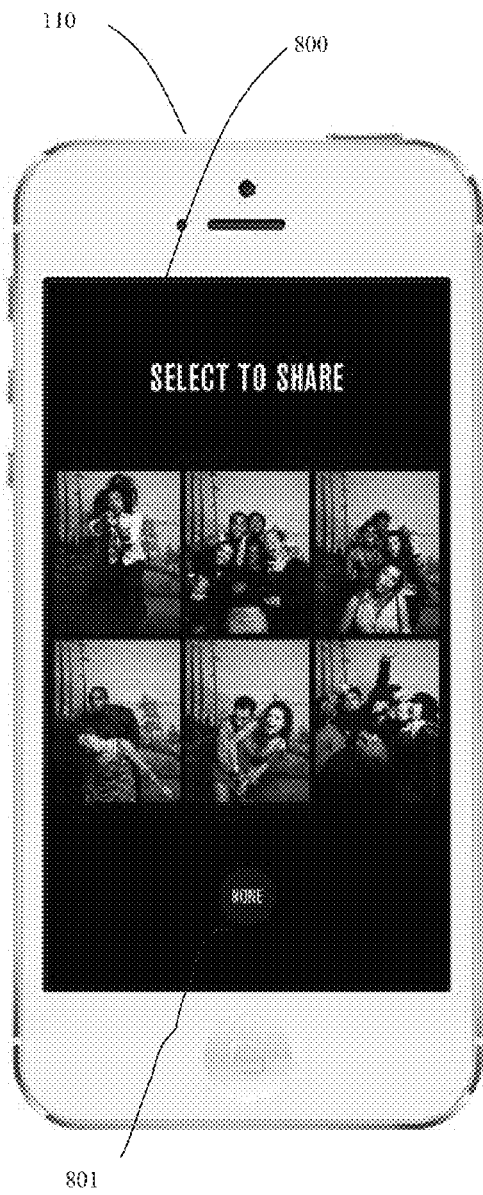
FIGS. 8A and 8B depict the interfaces whereby a user may choose photos to be shared.
Figure 8B:

As shown in FIGS. 8A and 8B, upon completion of the transfer of the photos to the user's mobile device 110, the SPP application presents a Select to Share user interface 800. Using this interface 800, the user can select the photos to share through social media, email or the like. If the user does not wish to share any pictures, the user may select "None" 801.

The user may choose photos to share by simply selecting the photos displayed in area 810. A check mark 811 appears on each photo which has been chosen by the user for sharing. Choosing a photo which already has a check mark unselects the photo for sharing. The user then selects "Share" 812 to indicate that she has completed choosing photos for sharing.

FIGS. 9A and 9B depicts the process for choosing a mode for sharing photos. After having chosen "Share" 812, a popup window 900 is presented to the user with choices 901 for sharing the photos, including social media, such as Facebook or Twitter, email, or the SPP stream. The SPP Stream is an archive of photos that people take using the application, and choose to share publicly on the server 140. The user may select one of the choices 901 and select "Done" 902. The SPP application presents a text window 910 and a keyboard interface 911 that allows the user to include text with her sharing of the photos. Upon completion of the text entry, the user selects "Done" 912, which causes the mobile device 110 to share the photos by transmitting them 115 though the Internet to a server 140 so that they may be accessed by other users through the Internet, If the user wishes to share the photos via particular social media network (e.g., Facebook™) The photos are downloaded from the server 140 and shared to social media from the user's device 110. Passwords and user IDs for these social media, outlets are stored via the device's operating system (e.g., IOS for Apple™ iPhones™).

Figure 10A:
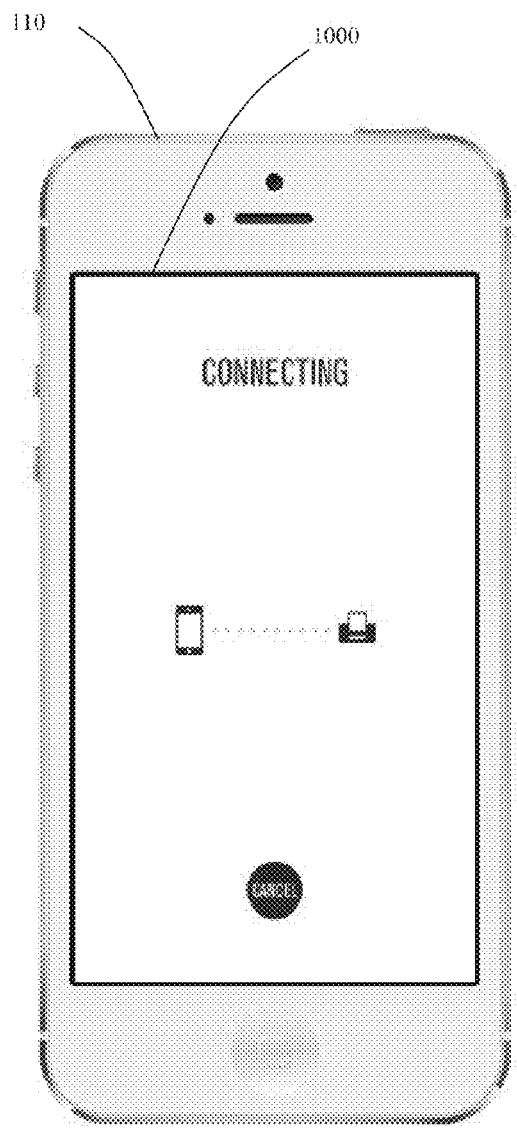
FIGS. 10A and 10B depict the mobile device connecting to a printer.
Figure 10B:
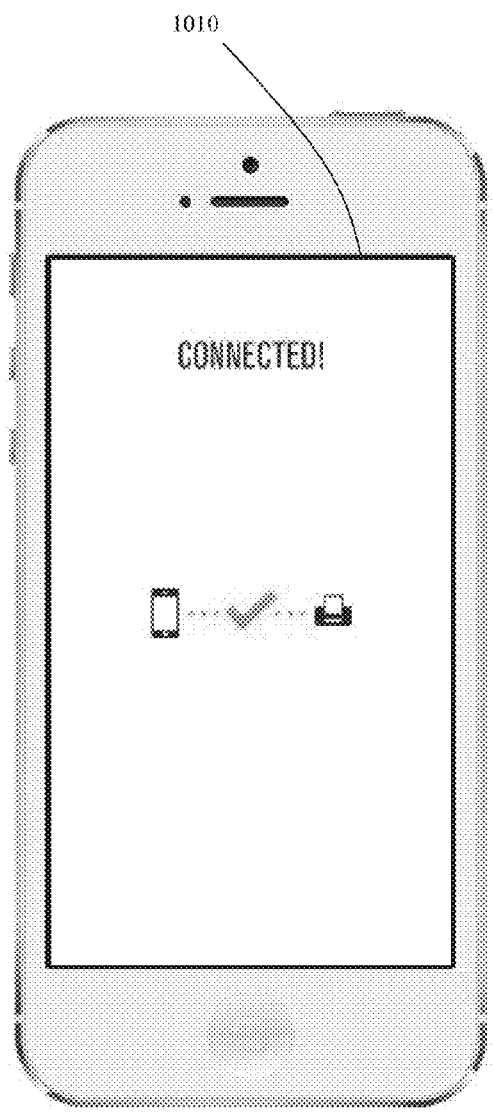

Referring now to FIGS. 10A and 10B, a user may use the SPP application to connect to a kiosk printer 150 wirelessly, such as through AirPort or other known wireless technology. In a preferred embodiment, the user's device 110 connects to the kiosk printer 150 through the kiosk computer 120. The SPP application indicates when the mobile device 110 is attempting to connect 1000 to a kiosk printer 150 and when that connection is successful 1010.

Figure 11A:
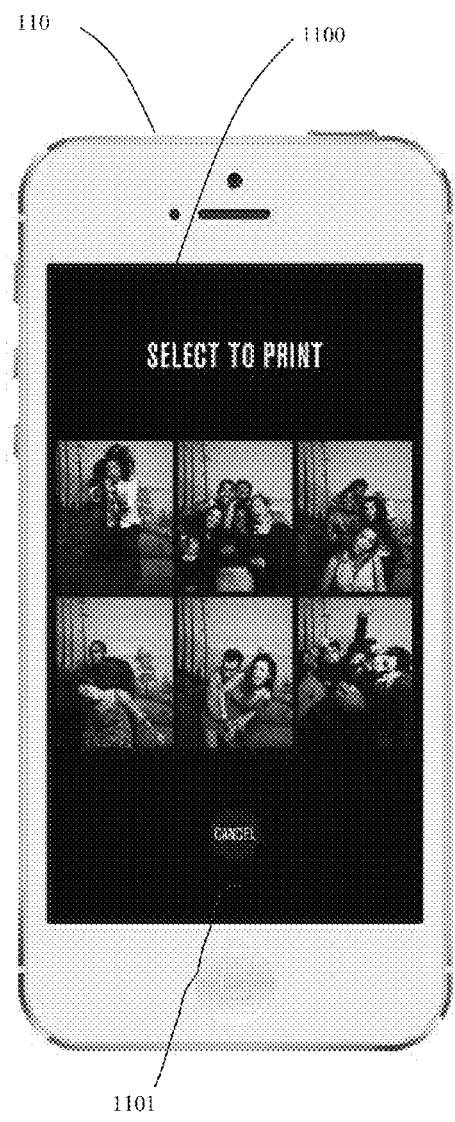
FIGS. 11A and 11B depict the interface whereby a user may choose photos to print.
Figure 11B:
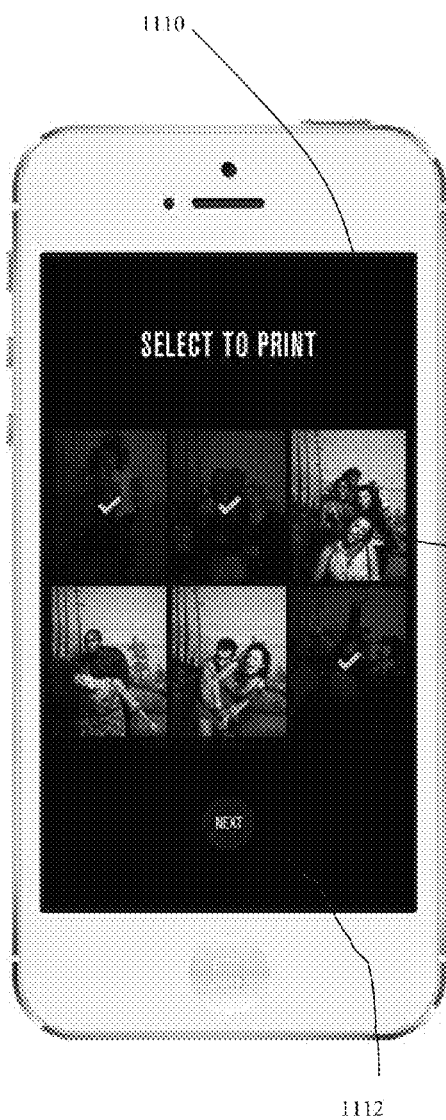

FIGS. 11A and 11B depict that upon connection to the kiosk printer 150, the SPP application presents a Select to Print user interface 1100 so that the user may select the photos to print. If the user does not wish to print any photos, the user may select "Cancel" 1101.

The user may choose photos to print by selecting the photos on the user interface 1110. A check mark 1111 appears on each photo which has been chosen by the user to be printed. Choosing a photo which already has a check mark unselects the photo for printing. The user then selects "Next" 1112 to proceed to the next step.

Figure 12A:
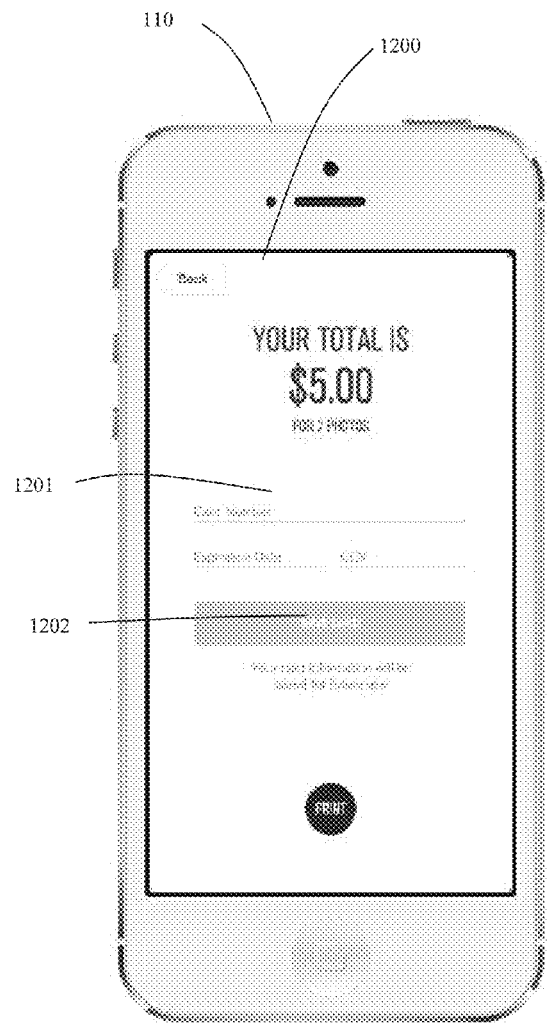
FIGS. 12A and 12B show a user paying for printed photos.
Figure 12B:
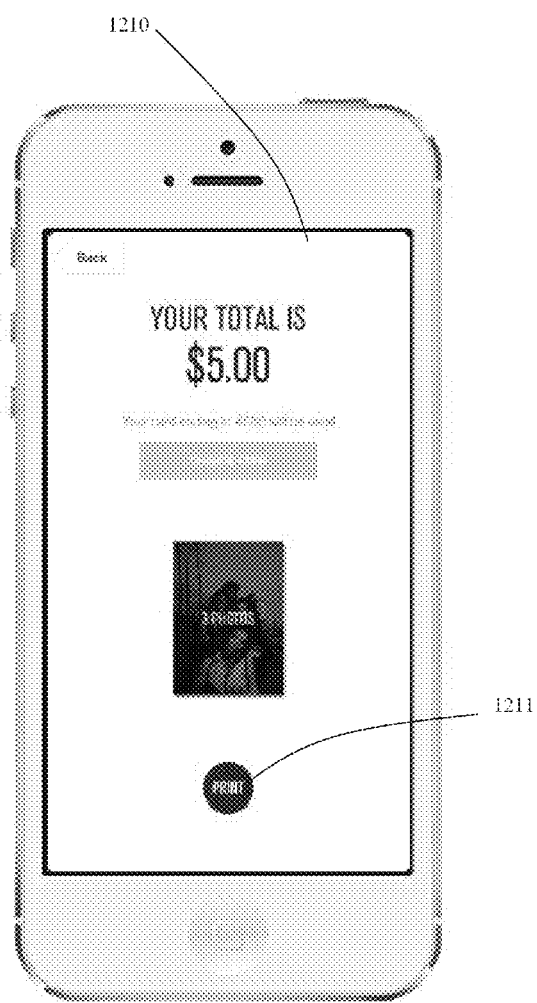

As shown in FIGS. 12A and 12B, the user is presented with a Print Payment user interface 1200 in which the user is presented with the cost associated with printing the selected photos. In one embodiment, the user may enter his credit card information 1201 and select "Save Card" 1202 to save the credit card information. In another embodiment, the user may enter PayPal, debit card or other payment information.

Upon saving the credit card information, the user is presented with the Print user interface 1210 where the user may select "Print" 1211 to cause the photos to be transmitted wireless 116 to the printer 150 for printing.

Figure 13:
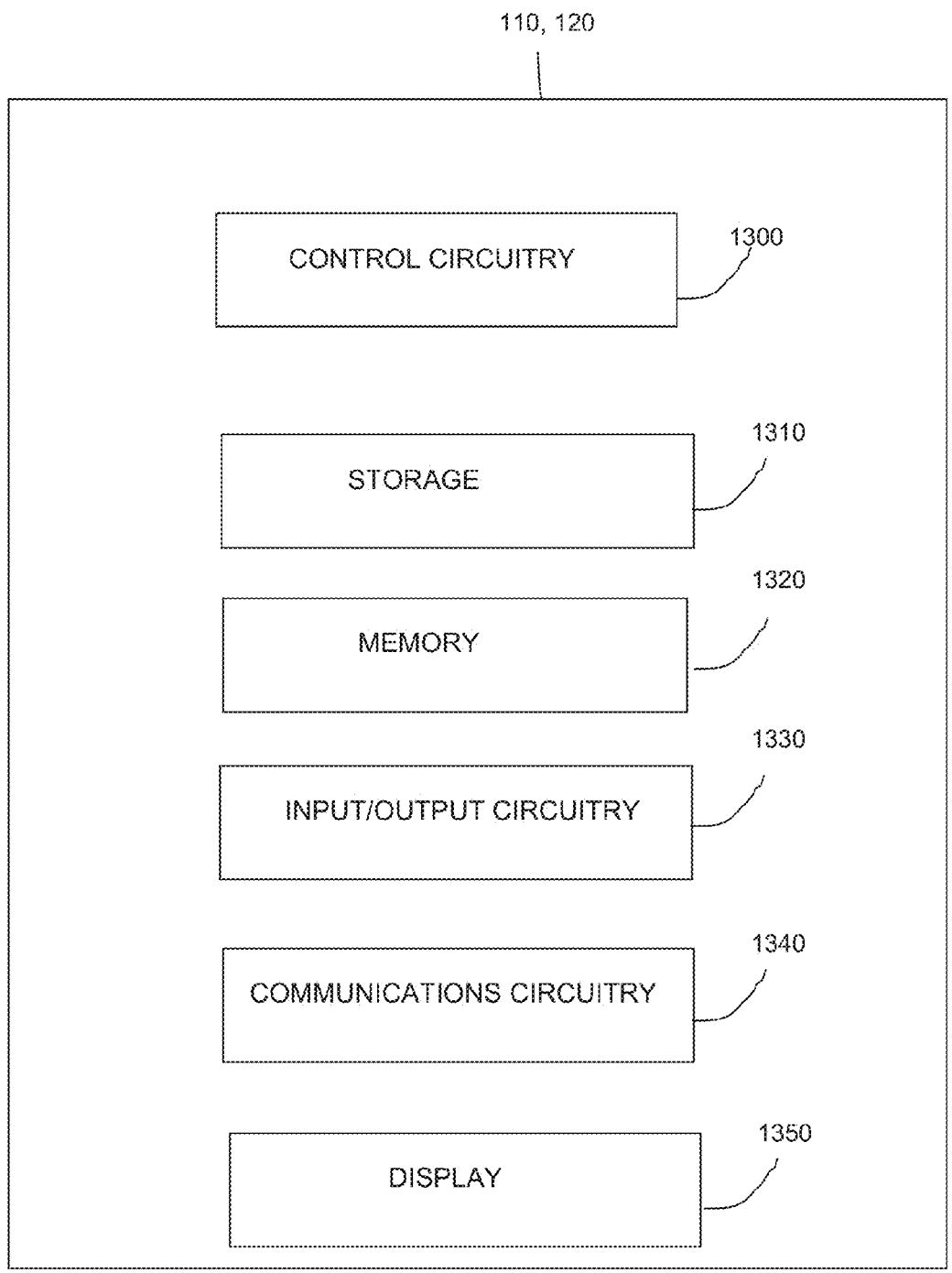
FIG. 13 illustrates exemplary embodiments of a kiosk computer and a mobile device.

FIG. 13 illustrates an exemplary embodiment of user device 110 and the kiosk computer 120. Although the device 110 is preferably a user's mobile device, e.g., a mobile phone, and the kiosk computer 120 is stationary computer house d in the kiosk 100, the basic components and operation are similar if not identical. As appreciated by those skilled the art, the user device 110 and the kiosk computer 120 can take many forms capable of operating the present invention. In a preferred embodiment the user device 110 is a mobile electronic device, and in an even more preferred embodiment device 110 is a mobile phone. Device 110 and computer 120 can include control circuitry 1300, storage 1310, memory 1320, input/output ("I/O") circuitry 1330, communications circuitry 1340, and display 1350. In some embodiments, one or more of the components of electronic device 110 and computer 120 can be combined or omitted, e.g., storage 1310 and memory 1320 may be combined. As appreciated by those skilled in the art, electronic device 110 and computer 120 can include other components not combined or included in those shown in FIG. 13, e.g., a power supply such as a battery, an input mechanism, etc.

Electronic device 110 can include any suitable type of electronic device. For example, electronic device 110 can include a portable electronic device that the user may hold in his or her hand, such as a digital media player, a personal e-mail device, a personal data assistant ("PDA"), a cellular telephone, a handheld gaming device or a tablet device.

Control circuitry 1300 can include any processing circuitry or processor operative to control the operations and performance of electronic device 110 or computer 120. For example, control circuitry 1300 can be used to run operating system applications, firmware applications, media playback applications, media editing applications, or any other application. Control circuitry 1300 can drive the display 1350 and process inputs received from a user interface, e.g., the display 1350 if it is a touch screen.

Storage 1310 can include, for example, one or more tangible computer storage mediums including a hard-drive, solid state drive, flash memory, permanent memory such as ROM, magnetic, optical, semiconductor, paper, or any other suitable type of storage component, or any combination thereof. Storage 1310 can store, for example, media content, e.g., digital photographs, data, e.g., software for implementing functions on electronic device 110 or computer 120, firmware, user preference information data, e.g., content preferences, authentication information, e.g., libraries of data associated with authorized users, transaction information data, e.g., information such as credit card information, wireless connection information data, e.g., information that can enable electronic device 110 or computer 120 to establish a wireless connection), contact information data, e.g., telephone numbers and email addresses, calendar information data, and any other suitable data or any combination thereof. The instructions for implementing the functions of the present invention may, as non-limiting examples, comprise non transient software and/or scripts stored in the computer-readable media 1310.

Memory 1320 can include cache memory, semi-permanent memory such as RAM, and/or one or more different types of memory used for temporarily storing data. In some embodiments, memory 1320 can also be used for storing non transient data used to operate software applications, or any other type of data that can be stored in storage 1310. In some embodiments, memory 1320 and storage 1310 can be combined as a single storage medium.

I/O circuitry 1330 can be operative to convert, and encode/decode, if necessary analog signals and other signals into digital data. In some embodiments, I/O circuitry 1330 can also convert digital data into any other type of signal, and vice-versa. For example, I/O circuitry 1330 can receive and convert physical contact inputs, e.g., from a multi-touch screen, i.e., display 1350, physical movements, e.g., from a mouse or sensor, analog audio signals, e.g., from a microphone, or any other input. The digital data can be provided to and received from control circuitry 1300, storage 1310, and memory 1320, or any other component of electronic device 110. Although I/O circuitry 1330 is illustrated in FIG. 13 as a single component of electronic device 130 or computer 120, several instances of I/O circuitry 1330 can be included in electronic device 110 or computer 120.

Electronic device 110 and or computer 120 can include any suitable interface or component for allowing a user to provide inputs to I/O circuitry 1330. For example, electronic device 110 cart include any suitable input mechanism, such as a button, keypad, dial, a click wheel, or a touch screen, e.g., display 1350. In some embodiments, electronic device 110 or computer 120 can include a capacitive sensing mechanism, or a multi-touch capacitive sensing mechanism.

In some embodiments, electronic device 110 or computer 120 can include specialized output circuitry associated with output devices such as, for example, one or more audio outputs. The audio output can include one or more speakers, e.g., mono or stereo speakers, built into electronic device 110, or an audio component that is remotely coupled to electronic device 110 or computer 120, e.g., a headset, headphones or earbuds that can be coupled to device 110 or computer 120 with a wire or wirelessly.

Display 1350 includes the display and display circuitry for providing a display visible to the user. For example, the display circuitry can include a screen, e.g., an LCD screen, that is incorporated in electronic device 110 or computer 120. In some embodiments, the display circuitry can include a coder/decoder (Codec) to convert digital media data into analog signals. For example, the display circuitry or other appropriate circuitry within electronic device 110 or computer 120 can include video Codecs, audio Codecs, or any other suitable type of Codec.

The display circuitry also can include display driver circuitry, circuitry for driving display drivers, or both. The display circuitry cart be operative to display content, e.g., media playback information, application screens for applications implemented on the electronic device 110 or computer 120, information regarding ongoing communications operations, information regarding incoming communications requests, or device operation screens, under the direction of control circuitry 1300. Alternatively, the display circuitry can be operative to provide instructions to a remote display.

Communications circuitry 1340 can include any suitable communications circuitry operative to connect to a communications network and to transmit communications, e.g., data from electronic device 110 or computer 120 to other devices within the communications network. Communications circuitry 1340 can be operative to interface with the communications network using any suitable communications protocol such as, for example, e.g., a 802.11 protocol, Bluetooth, radio frequency systems, e.g., 900 MHz, 1.4 GHz, and 5.6 GHz communication systems, infrared, GSM, GSM plus EDGE, CDMA, quadband, and other cellular protocols, VOIP, or any other suitable protocol.

Electronic device 110 or computer 120 can include one more instances of communications circuitry 1340 for simultaneously performing several communications operations using different communications networks, although only one is shown in FIG. 13 to avoid overcomplicating the drawing. For example, electronic device 110 or computer 120 can include a first instance of communications circuitry 1340 for communicating over a cellular network, and a second instance of communications circuitry 1340 for communicating over Wi-Fi or using Bluetooth. In some embodiments, the same instance of communications circuitry 1340 can be operative to provide for communications over several communications networks.

In some embodiments, electronic device 110 or computer 120 can be coupled to a host device such as server 140 for data transfers, synching the communications device, software or firmware updates, or performing any other suitable operation that can require electronic device 110 or computer 120 to be coupled to a host device.

Although the present invention has been described in relation to particular embodiments thereof, many other variations and other uses will be apparent to those skilled in the art, it is preferred, therefore, that the present invention be limited not by the specific disclosure herein, but only by the gist and scope of the disclosure.

What is claimed is:

1. A method for controlling a photo kiosk to capture and distribute self-portrait digital photographs comprising:
   a) establishing a wireless connection between a computer in the photo kiosk and a mobile device;
   b) receiving, by the computer, a user instruction from the mobile device to take a self-portrait digital photograph when the user is positioned in front of a camera in the photo kiosk;
   c) transmitting a shutter instruction from the computer to the camera;
   d) activating a shutter in the camera in response to receipt of the shutter instruction, thereby taking a self-portrait digital photograph;
   e) transmitting the self-portrait digital photograph from the camera to the computer;
   f) transmitting the self-portrait digital photograph from the computer to a central server;
   g) storing the self-portrait digital photograph on the central server;
   h) allowing public access to the self-portrait digital photograph stored on the central server; and
   i) transmitting the self-portrait digital photograph from the central server to the mobile device.

2. The method of claim 1, further comprising filtering the self-portrait digital photograph in the computer.

3. The method of claim 1, determining an order in which a plurality of mobile devices can use the photo kiosk and transmitting that order to respective mobile devices.

4. The method of claim 1, further comprising:
   establishing an account on the central server for the user of the mobile device; and
   wherein the act of storing the self-portrait digital photograph further comprises storing the self-portrait digital photograph in association with the user's account.

5. The method of claim 4, wherein the act of allowing public access further comprises:
   allowing public access to the self-portrait digital photograph stored in association with the user's account.

6. The method of claim 1, further comprising repeating steps b)-i) for a plurality of self-portrait digital photographs.

7. The method of claim 6, further comprising:
   viewing the plurality of self-portrait digital photographs on the mobile device;
   selecting at least one of the self-portrait digital photographs; and
   transmitting the selected self-portrait digital photograph to a different electronic device.

8. The method of claim 7, wherein the act of transmitting the selected self-portrait digital photograph to a different electronic device further comprises transmitting the selected self-portrait digital photograph by email.

9. The method of claim 7, wherein the act of transmitting the selected self-portrait digital photograph to a different electronic device further comprises transmitting the selected self-portrait digital photograph by a social network.

10. A photo kiosk system for taking and distributing self-portrait digital photographs comprising:
   a memory that includes instructions for operating the photo kiosk;
   a camera having a shutter; and
   control circuitry coupled to the memory and coupled to the camera, the control circuitry capable of executing the instructions and is operable to at least:
   a) establish a wireless connection between the control circuitry and a mobile device;
   b) receive, by the control circuitry, a user instruction from the mobile device to take a self-portrait digital photograph when the user is positioned in front of a camera in the photo kiosk;
   c) transmitting a shutter instruction from the control circuitry to the camera;
   d) activate the shutter in the camera in response to receipt of the shutter instruction, thereby taking a self-portrait digital photograph;

e) transmit the self-portrait digital photograph from the camera to the control circuitry; and f) transmit the self-portrait digital photograph from the control circuitry to the mobile device.

11. The system of claim 10, wherein the control circuitry is further operable to filter the self-portrait digital photograph.

12. The system of claim 10, wherein the control circuitry is further operable to determine an order in which a plurality of mobile devices can use the photo kiosk and transmitting that order to respective mobile devices.

13. The system of claim 10, wherein the control circuitry is further operable to repeat steps b)-f) for a plurality of self-portrait digital photographs.

14. The system of claim 10 further comprising a server wirelessly coupled to the control circuitry and the mobile device, wherein the act of transmitting the self-portrait digital photograph from the control circuitry to the mobile device further comprises transmitting the self-portrait digital photograph from the control circuitry to the server, and transmitting the self-portrait digital photograph from the server to the mobile device.

15. A non-transitory computer-readable medium comprising a plurality of instructions that, when executed by a mobile device, at least cause the mobile device to:

a) establish a wireless connection between the mobile device and a photo kiosk;

b) receive a user instruction on the mobile device to take a self-portrait digital photograph when the user is positioned in front of a camera in the photo kiosk c) transmit a shutter instruction from the mobile device to the photo kiosk, wherein the shutter instruction activates a shutter in a camera in the photo kiosk, thereby taking a self-portrait digital photograph; and d) receive and store the self-portrait digital photograph from the photo kiosk.

16. The non-transitory computer-readable medium of claim 15, wherein the instructions further cause the mobile device to repeat steps b)-d) for a plurality of self-portrait digital photographs.

17. The non-transitory computer-readable medium of claim 15, wherein the instructions further cause the mobile device to:

display the plurality of self-portrait digital photographs on the mobile device;

receive a selection of at least one of the self-portrait digital photographs; and transmit the selected self-portrait digital photograph to a different electronic device.

18. The non-transitory computer-readable medium of claim 17, wherein the instructions cause the mobile device to transmit the selected self-portrait digital photograph by email.

19. The non-transitory computer-readable medium of claim 17, wherein the instructions cause the mobile device to transmit the selected self-portrait digital photograph by a social network.

* * * * *